(12) United States Patent
Goswami (10) Patent No.: US 7,580,774 B2
(45) Date of Patent: Aug. 25, 2009

(54) CHARACTERIZATION AND CLASSIFICATION OF POSE IN LOW DIMENSION

(75) Inventor: Ambarish Goswami, Fremont, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/746,540

(22) Filed: May 9, 2007

(65) Prior Publication Data

US 2007/0265732 A1 Nov. 15, 2007

Related U.S. Application Data

(60) Provisional application No. 60/799,491, filed on May 10, 2006.

(51) Int. Cl.
*G06F 7/00* (2006.01)
(52) U.S. Cl. .................. 700/245; 700/258; 700/259; 700/262; 700/263
(58) Field of Classification Search .................. 700/258, 700/259, 245, 262, 263
See application file for complete search history.

(56) References Cited

U.S. PATENT DOCUMENTS

| 6,947,579 | B2 | 9/2005 | Bronstein et al. | |
|---|---|---|---|---|
| 7,035,757 | B2 | 4/2006 | Raykar et al. | |
| 2004/0076313 | A1* | 4/2004 | Bronstein et al. | 382/118 |

OTHER PUBLICATIONS

Saboune, et al., 2005, IEEE, 17th Conference.*

Brijnesh J. Jain et al, *Central Clustering of Attributed Graphs*, Machine Learning, vol. 56, Feb. 3, 2004, pp. 169-207, The Netherlands.

Monique Laurent, *Matrix Completion Problems*, Article P0550, pp. 1-15, The Netherlands.

Josep M. Porta et al, *Inverse Kinematics by Distance Matrix Completion*, Proceedings of CK2005, 12th International Workshop on Computational Kinematics, May 4-6, 2005, pp. 1-9, Spain.

R. Van Liere et al, *An Experimental Comparison of Three Optical Trackers for Model Based Pose Determination in Virtual Reality*, Eurogaphics Symposium on Virtual Environments, 2004, pp. 1-9, The Netherlands.

(Continued)

*Primary Examiner*—Khoi Tran
*Assistant Examiner*—Nikhil Sriraman
(74) *Attorney, Agent, or Firm*—Fenwick & West LLP; Mark E. Duell (57) ABSTRACT

A BodyMap matrix for a pose includes elements representing Euclidean distances between markers on the object. The BodyMap matrix can be normalized and visualized using a grayscale or mesh image, enabling a user to easily interpret the pose. The pose is characterized in a low-dimensional space by determining the singular values of the BodyMap matrix for the pose and using a small set of dominant singular values to characterize and visually represent the pose. A candidate pose is classified in a low-dimensional space by comparing the characterization of the candidate pose to characterizations of known poses and determining which known pose is most similar to the candidate pose. Determining the similarity of the candidate pose to the known poses is accomplished through distance calculations, including the calculation of Mahalanobis distances from the characterization of the candidate pose to characterizations of known poses and their noisy variations.

10 Claims, 12 Drawing Sheets

OTHER PUBLICATIONS

*Distance Matrix*, [Online], [Retrieved on Nov. 20, 2006], Retrieved from the internet<URL:http://en.wikipedia.org/wiki/Distance_matrix>.

*Euclidean Distance Matrix*, [Online], [Retrieved on Nov. 30, 2006], Retrieved from the internet<URL:http://en.wikipedia.org/wiki/Euclidean_distance_matrix>.

* cited by examiner

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| -1 | 0 | 0.4300 | 0.6100 | 0.3140 | 0.2005 | 0.1907 | 0.6389 | 0.8184 | 0.8964 | 0.2720 | 0.5261 | 0.5360 | 0.2720 | 0.5261 | 0.5360 |
| -2 | 0.4300 | 0 | 0.1800 | 0.2617 | 0.4124 | 0.4848 | 0.2617 | 0.4124 | 0.4848 | 0.6946 | 0.9534 | 0.9589 | 0.6946 | 0.9534 | 0.9589 |
| -3 | 0.6100 | 0.1800 | 0 | 0.4071 | 0.5781 | 0.6542 | 0.1900 | 0.2659 | 0.3269 | 0.8737 | 1.1328 | 1.1375 | 0.8737 | 1.1328 | 1.1375 |
| -4 | 0.3140 | 0.2617 | 0.4071 | 0 | 0.1860 | 0.2660 | 0.5235 | 0.6652 | 0.7323 | 0.5217 | 0.7778 | 0.7723 | 0.5771 | 0.8160 | 0.8338 |
| -5 | 0.2005 | 0.4124 | 0.5781 | 0.1860 | 0 | 0.0800 | 0.6652 | 0.8248 | 0.8965 | 0.3422 | 0.5943 | 0.5871 | 0.4218 | 0.6434 | 0.6659 |
| -6 | 0.1907 | 0.4848 | 0.6542 | 0.2660 | 0.0800 | 0 | 0.7323 | 0.8965 | 0.9696 | 0.2676 | 0.5159 | 0.5076 | 0.3639 | 0.5718 | 0.5970 |
| -7 | 0.6389 | 0.2617 | 0.1900 | 0.5235 | 0.6652 | 0.7323 | 0 | 0.1860 | 0.2660 | 0.9109 | 1.1618 | 1.1744 | 0.8769 | 1.1353 | 1.1316 |
| -8 | 0.8184 | 0.4124 | 0.2659 | 0.6652 | 0.8248 | 0.8965 | 0.1860 | 0 | 0.0800 | 1.0900 | 1.3434 | 1.3543 | 1.0617 | 1.3206 | 1.3174 |
| -9 | 0.8964 | 0.4848 | 0.3269 | 0.7323 | 0.8965 | 0.9696 | 0.2660 | 0.0800 | 0 | 1.1676 | 1.4219 | 1.4322 | 1.1413 | 1.4003 | 1.3973 |
| -10 | 0.2720 | 0.6946 | 0.8737 | 0.5217 | 0.3422 | 0.2676 | 0.9109 | 1.0900 | 1.1676 | 0 | 0.2600 | 0.2648 | 0.3342 | 0.3053 | 0.3342 |
| -11 | 0.5261 | 0.9534 | 1.1328 | 0.7778 | 0.5943 | 0.5159 | 1.1618 | 1.3434 | 1.4219 | 0.2600 | 0 | 0.0500 | 0.3053 | 0.1600 | 0.2100 |
| -12 | 0.5360 | 0.9589 | 1.1375 | 0.7723 | 0.5871 | 0.5076 | 1.1744 | 1.3543 | 1.4322 | 0.2648 | 0.0500 | 0 | 0.3342 | 0.2100 | 0.2600 |
| -13 | 0.2720 | 0.6946 | 0.8737 | 0.5771 | 0.4218 | 0.3639 | 0.8769 | 1.0617 | 1.1413 | 0.1600 | 0.3053 | 0.3342 | 0 | 0.2600 | 0.2648 |
| -14 | 0.5261 | 0.9534 | 1.1328 | 0.8160 | 0.6434 | 0.5718 | 1.1353 | 1.3206 | 1.4003 | 0.3053 | 0.1600 | 0.2100 | 0.2600 | 0 | 0.0500 |
| -15 | 0.5360 | 0.9589 | 1.1375 | 0.8338 | 0.6659 | 0.5970 | 1.1316 | 1.3174 | 1.3973 | 0.3342 | 0.2100 | 0.2600 | 0.2648 | 0.0500 | 0 |

Distance between markers 4 and 11

FIG. 3A

|    | 1 | 2 | 3 | 4 | 5 | 6 | 7 | 8 | 9 | 10 | 11 | 12 | 13 | 14 | 15 |
|----|---|---|---|---|---|---|---|---|---|----|----|----|----|----|----|
| -1 | 0 | 0.0402 | 0.0570 | 0.0314 | 0.0246 | 0.0250 | 0.0587 | 0.0748 | 0.0820 | 0.0254 | 0.0492 | 0.0501 | 0.0254 | 0.0492 | 0.0501 |
| -2 | 0.0402 | 0 | 0.0168 | 0.0265 | 0.0412 | 0.0481 | 0.0223 | 0.0357 | 0.0424 | 0.0650 | 0.0891 | 0.0897 | 0.0650 | 0.0891 | 0.0897 |
| -3 | 0.0570 | 0.0168 | 0 | 0.0393 | 0.0558 | 0.0631 | 0.0148 | 0.0206 | 0.0264 | 0.0817 | 0.1059 | 0.1064 | 0.0817 | 0.1059 | 0.1064 |
| -4 | 0.0314 | 0.0265 | 0.0393 | 0 | 0.0174 | 0.0249 | 0.0486 | 0.0599 | 0.0656 | 0.0497 | 0.0735 | 0.0728 | 0.0556 | 0.0776 | 0.0794 |
| -5 | 0.0246 | 0.0412 | 0.0558 | 0.0174 | 0 | 0.0075 | 0.0634 | 0.0762 | 0.0822 | 0.0348 | 0.0575 | 0.0563 | 0.0438 | 0.0633 | 0.0658 |
| -6 | 0.0250 | 0.0481 | 0.0631 | 0.0249 | 0.0075 | 0 | 0.0701 | 0.0834 | 0.0895 | 0.0293 | 0.0509 | 0.0495 | 0.0401 | 0.0578 | 0.0605 |
| -7 | 0.0587 | 0.0223 | 0.0148 | 0.0486 | 0.0634 | 0.0701 | 0 | 0.0174 | 0.0249 | 0.0841 | 0.1077 | 0.1088 | 0.0814 | 0.1057 | 0.1054 |
| -8 | 0.0748 | 0.0357 | 0.0206 | 0.0599 | 0.0762 | 0.0834 | 0.0174 | 0 | 0.0075 | 0.1001 | 0.1240 | 0.1249 | 0.0983 | 0.1226 | 0.1225 |
| -9 | 0.0820 | 0.0424 | 0.0264 | 0.0656 | 0.0822 | 0.0895 | 0.0249 | 0.0075 | 0 | 0.1071 | 0.1311 | 0.1319 | 0.1056 | 0.1299 | 0.1299 |
| -10 | 0.0254 | 0.0650 | 0.0817 | 0.0497 | 0.0348 | 0.0293 | 0.0841 | 0.1001 | 0.1071 | 0 | 0.0243 | 0.0248 | 0.0150 | 0.0285 | 0.0313 |
| -11 | 0.0492 | 0.0891 | 0.1059 | 0.0735 | 0.0575 | 0.0509 | 0.1077 | 0.1240 | 0.1311 | 0.0243 | 0 | 0.0047 | 0.0285 | 0.0150 | 0.0196 |
| -12 | 0.0501 | 0.0897 | 0.1064 | 0.0728 | 0.0563 | 0.0495 | 0.1088 | 0.1249 | 0.1319 | 0.0248 | 0.0047 | 0 | 0.0313 | 0.0196 | 0.0243 |
| -13 | 0.0254 | 0.0650 | 0.0817 | 0.0556 | 0.0438 | 0.0401 | 0.0814 | 0.0983 | 0.1056 | 0.0150 | 0.0285 | 0.0313 | 0 | 0.0243 | 0.0248 |
| -14 | 0.0492 | 0.0891 | 0.1059 | 0.0776 | 0.0633 | 0.0578 | 0.1057 | 0.1226 | 0.1299 | 0.0285 | 0.0150 | 0.0196 | 0.0243 | 0 | 0.0047 |
| -15 | 0.0501 | 0.0897 | 0.1064 | 0.0794 | 0.0658 | 0.0605 | 0.1054 | 0.1225 | 0.1299 | 0.0313 | 0.0196 | 0.0243 | 0.0248 | 0.0047 | 0 |

Frobenius Norm: 10.6946

CHARACTERIZATION AND CLASSIFICATION OF POSE IN LOW DIMENSION

CROSS-REFERENCE TO RELATED APPLICATION

This application claims priority from the following U.S. provisional patent application, which is hereby incorporated by reference: Ser. No. 60/799,491, filed on May 10, 2006 entitled "BodyMap Matrix: A New Tool For Recognition And Classification Of Human Pose In Very Low Dimension."

BACKGROUND OF THE INVENTION

1. Field of the Invention

The present invention relates to characterizing and classifying a pose in low dimension.

2. Description of Background Art

A human pose is a unique configuration of the body. A pose can be described by a θ, an n×1 vector of configuration variables, usually the joint angles. With knowledge of the limb segment geometry (e.g., the shapes and sizes of the limb segments) and the types of joints involved, which are all constants for a particular human model, θ can describe the pose. To completely describe a human pose, n may need to be as high as 40.

Figure 1:
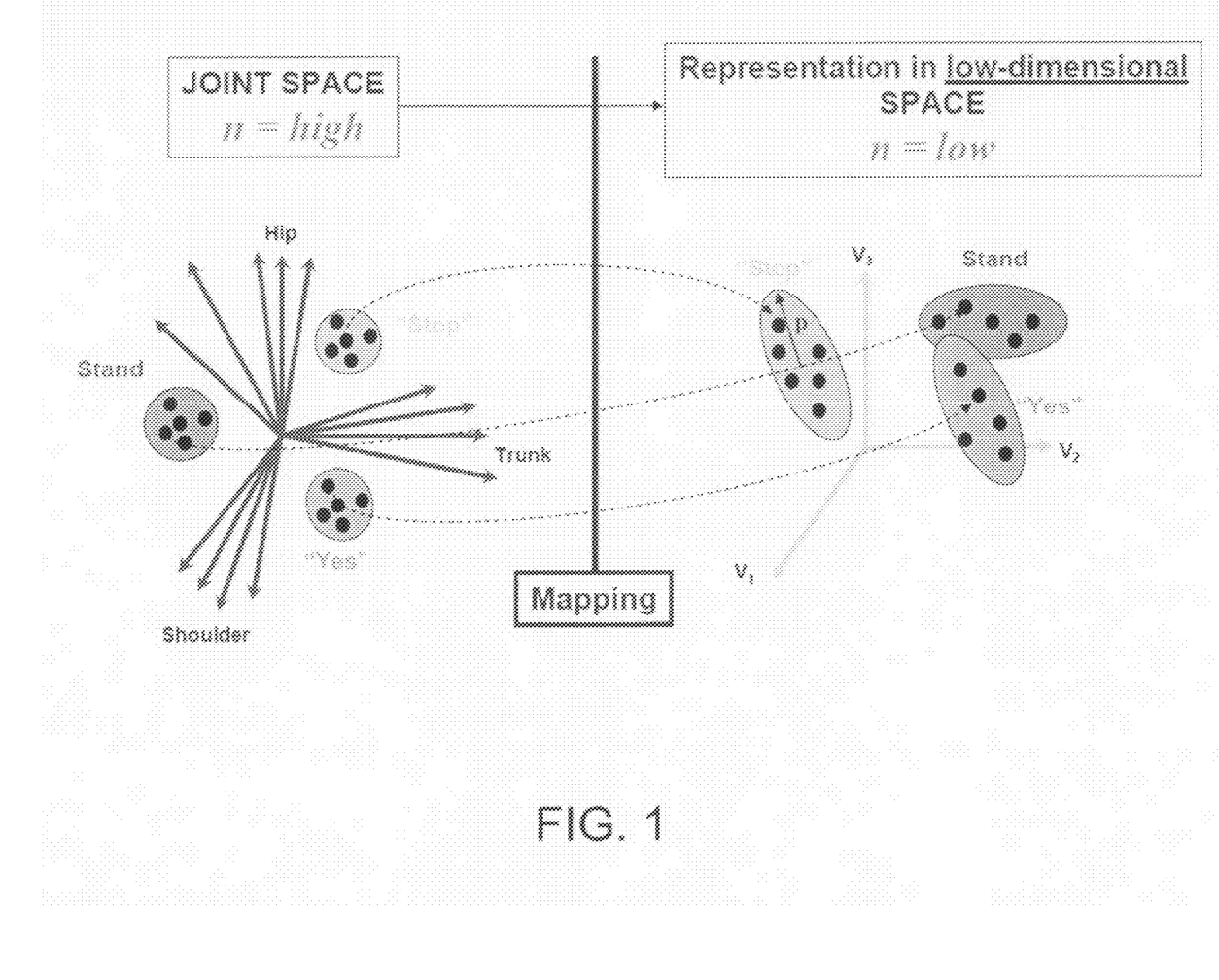
FIG. 1 illustrates representations of human poses in low-dimensional and high-dimensional spaces.

FIG. 1 illustrates representations of a human pose in high-dimensional and low-dimensional space. θ can be represented in an n-dimensional space spanned by the configuration variables (here, joint angles) and referred to as the joint space, illustrated at the left of FIG. 1. Each point in the joint space represents a unique pose. A range of similar poses is represented as a cluster of points. For example, a number of different standing poses is represented by the "Stand" cluster. As mentioned above, n may need to be as high as 40, making the joint space a very high dimension space. As a result, analysis in this space, including automated characterization and classification of human poses, can be difficult.

Human poses can also be represented in a low-dimensional space as illustrated on the right side of FIG. 1. This low-dimensional space is often called a "feature space" indicating that the space is spanned by a small number of features associated with the pose. The illustrated feature space is a three dimensional space containing the same poses as the joint space. Identical poses in the two spaces are connected by dotted lines. Analysis and visualization of poses can be improved when the poses are represented in a low-dimensional feature space. Classification and recognition problems become simpler.

What is needed is a method for representing a human poses in a low-dimensional space in a way that allows for efficient characterization and classification of the pose.

SUMMARY OF THE INVENTION

The above need is met by a methods for visualizing, characterizing, and classifying a pose of an object such as a human. A BodyMap matrix for a pose includes elements representing Euclidean distances between markers (or points of interest) on the object. The BodyMap matrix can be normalized to be scale invariant. The BodyMap matrix can be visualized using a grayscale or mesh image, enabling a user to easily understand certain information about the pose and to interpret the pose. The pose is characterized in a low-dimensional space by determining the singular values of the BodyMap matrix for the pose and using a small set of dominant singular values to characterize and visually represent the pose. A candidate pose is classified in a low-dimensional space by comparing the characterization of the candidate pose to characterizations of known poses and determining which known pose is most similar to the candidate pose. Determining the similarity of the candidate pose to the known poses is accomplished through distance calculations, including the calculation of Mahalanobis distances from the characterization of the candidate pose to characterizations of known poses and their noisy variations.

BRIEF DESCRIPTION OF THE DRAWINGS

The invention is illustrated by way of example, and not by way of limitation, in the figures of the accompanying drawings in which like reference numerals refer to similar elements.

FIG. 3A illustrates a BodyMap matrix for the human pose of FIG. 2, according to one embodiment.

FIG. 3B illustrates a normalized version of FIG. 3A, according to one embodiment.

DETAILED DESCRIPTION OF THE EMBODIMENTS

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

1. BodyMap Matrix

Figure 2:
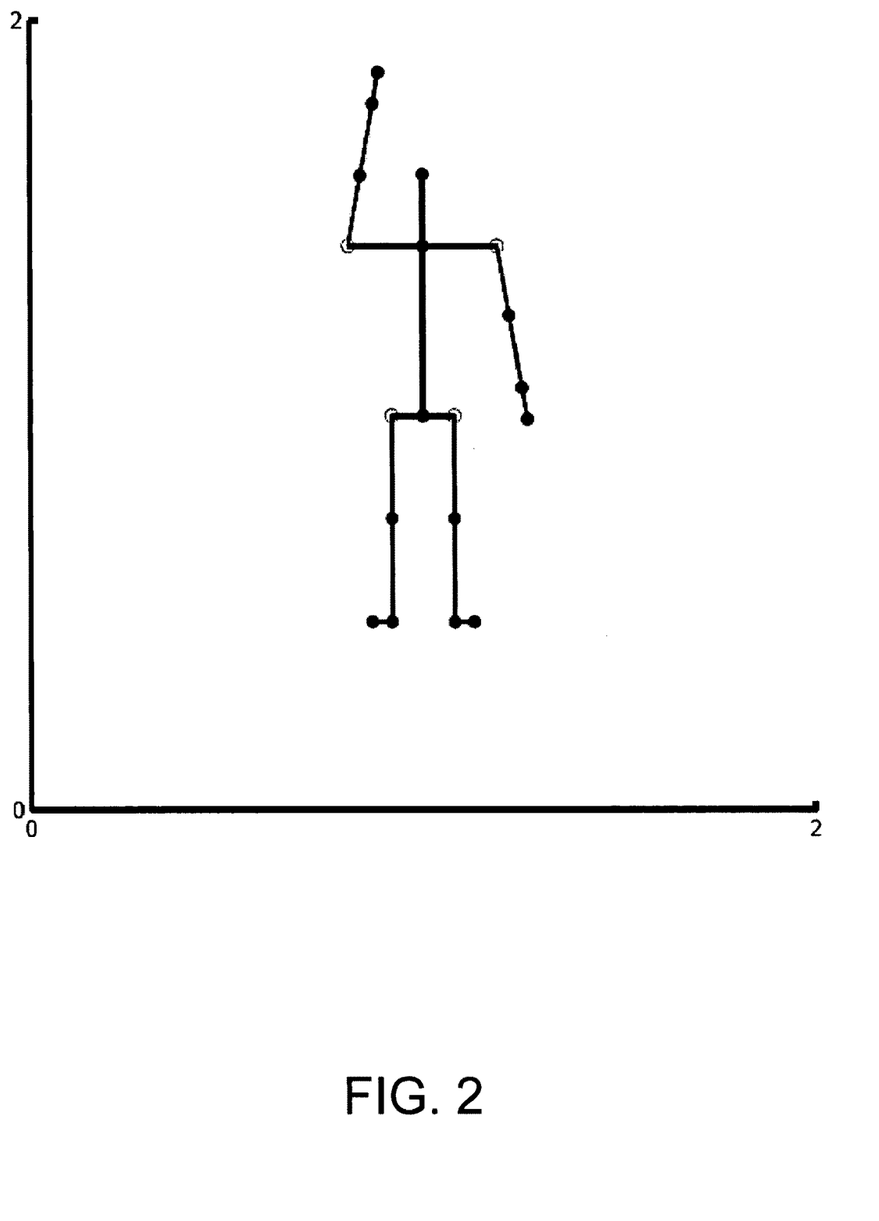
FIG. 2 illustrates a human pose with markers, according to one embodiment.

A BodyMap matrix is constructed from a set of n points of interest on the human body. A point of interest can be the location of a biomechanical feature such as a bony protrusion (for example, the iliac crest or the greater trochanter), a joint, the center of a limb segment, or simply the position coordinates of a sensor attached to the body. These points of interest are also referred to as "markers." FIG. 2 illustrates a human pose with fifteen markers located at various points on the body, according to one embodiment. Although a human is used as an example, this technique can be used with humans, animals, and other poseable objects (e.g., robots).

In general, the number of markers and the location of markers are freely chosen. The markers can be chosen to fully describe a pose or to display desired information in the BodyMap matrix. The location and number of markers can be determined experimentally by observing whether the characterization and classification of poses is performed correctly with a given set of markers. Since the technique can be made dimension-insensitive (see below), the markers can be placed in a small region of the body. For example, markers on the hand can characterize hand gestures, and markers on the face can characterize facial expressions.

In one embodiment, a set of opto-electronic devices such as infra-red LEDs are attached to the body of the human as markers. The markers are then viewed by infra-red sensitive cameras surrounding the subject. When a marker is simultaneously seen by three or more cameras, its coordinates can be easily computed and recorded in a computer.

The n×n BodyMap matrix B is constructed such that each element $B_{ij}$ is the Euclidean distance between markers i and j:

$$B_{ij}=d_{ij}=\sqrt{(x_j-x_i)^2+(y_j-y_i)^2+(z_j-z_i)^2} \qquad (1)$$

$$B_{ii}=0 \qquad (2)$$

where $x_i$, $y_i$, and $z_i$ are the coordinates of marker i, where $x_j$, $y_j$, and $z_j$ are the coordinates of marker j, and where $d_{ij}$ is the Euclidean distance between markers i and j.

FIG. 3A illustrates a BodyMap matrix for the human pose of FIG. 2, according to one embodiment. As described above, the elements represent Euclidean distances between markers of the row and column indices. For example, the distance between marker 4 and marker 11 is 0.7778 (units omitted).

The BodyMap matrix can be normalized or otherwise transformed. Normalization makes the matrix scale-invariant (i.e., dimension-insensitive) so that persons of different body-dimensions are treated in a uniform manner. Possible normalizations include the Frobenius-norm, infinity-norm and two-norm.

FIG. 3B illustrates an Frobenius-norm normalized version of FIG. 3A. The Frobenius-norm is the square root of the sum of the squares of the matrix elements. Every element of the BodyMap matrix is then divided by the Frobenius-norm to produce a Frobenius-norm normalized matrix. The infinity-norm (not shown) is calculated by summing the absolute values of the elements in each row of the BodyMap matrix.

The largest of these row-sums is the infinity-norm. Every element of the BodyMap matrix is then divided by the infinity-norm to produce an infinity-norm normalized matrix. The two-norm (not shown) is the largest singular value of the BodyMap matrix (possibly obtained through a singular value decomposition as described below). Every element of the BodyMap matrix is divided by the two-norm to produce a two-norm normalized matrix.

Figure 4:
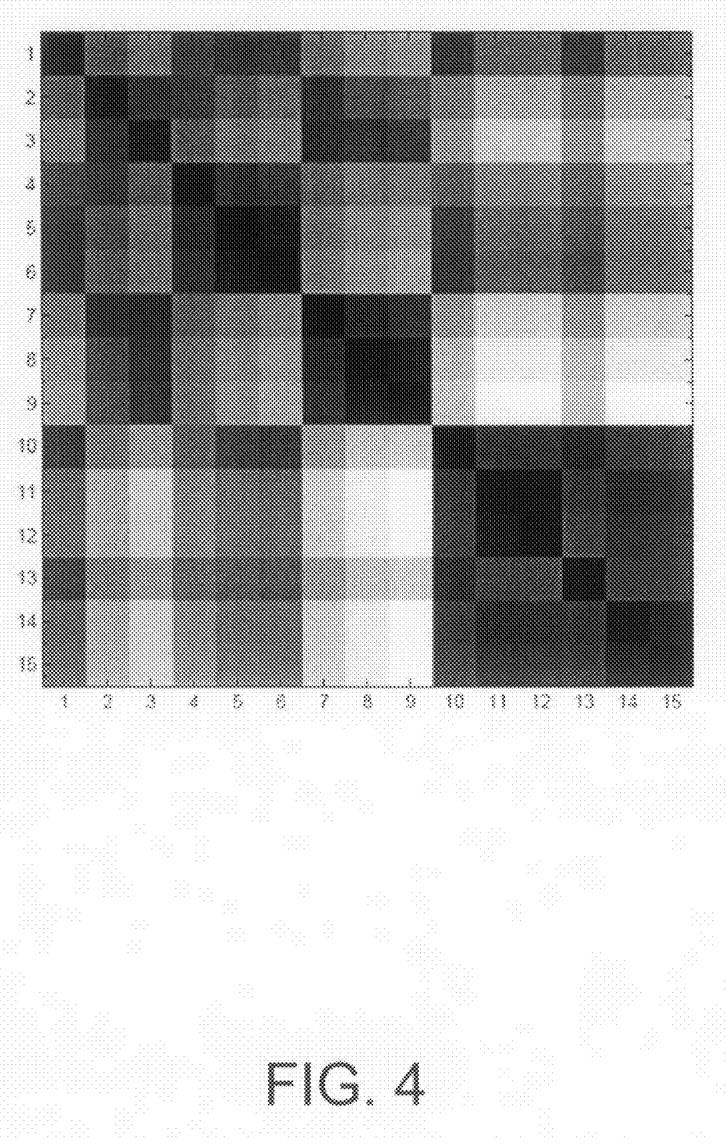
FIG. 4 illustrates a grayscale image visualization of the BodyMap matrix of FIG. 3B, according to one embodiment.

FIG. 4 illustrates a grayscale image visualization of the BodyMap matrix of FIG. 3B, according to one embodiment. The brightness of the cells correspond to the values of the BodyMap matrix. The darker areas correspond to markers located close together while the lighter areas correspond to markers farther apart.

Figure 5:
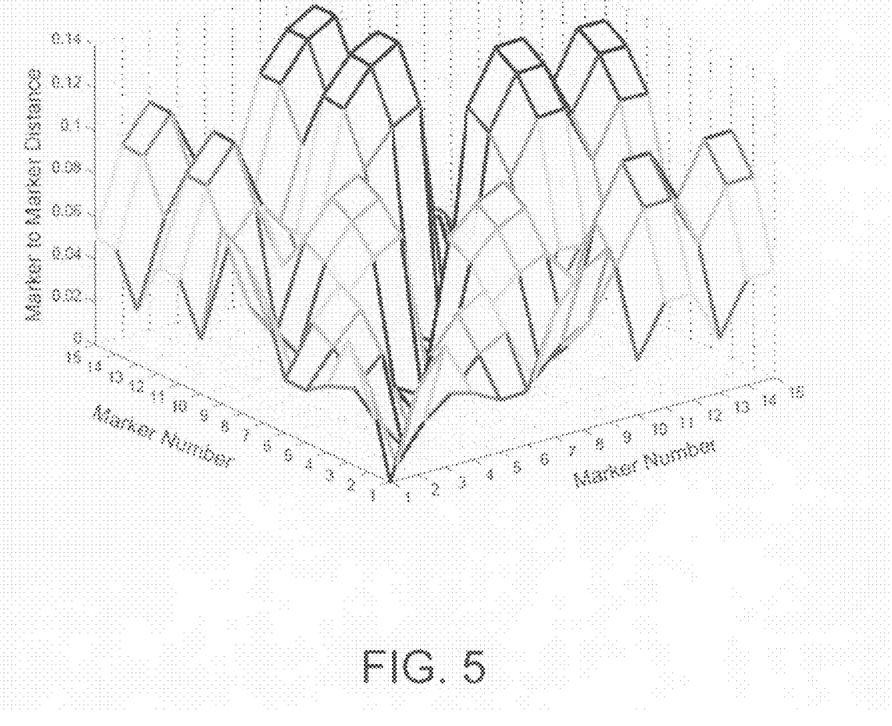
FIG. 5 illustrates a mesh visualization of the BodyMap matrix of FIG. 3B, according to one embodiment.

FIG. 5 illustrates a mesh visualization of the BodyMap matrix of FIG. 3B, according to one embodiment. The height of the mesh at any given point is equal to the value of the BodyMap matrix element at that cell. In Cartesian space, the x and y coordinates of a mesh point are the row and column indices of the BodyMap matrix while its z coordinate is the corresponding BodyMap matrix element value. The mesh visualization allows for an easy visual interpretation of a pose.

For an n-marker system, the BodyMap matrix B is an n×n square symmetric matrix with positive elements. The diagonal elements $B_{ij}$ are all zero, being the trivial distance between markers i and i. There is no necessary order in which the markers are numbered. As a result, a number of different BodyMap matrices can all refer to the same pose. However, the form of the grayscale image or mesh depends on the particular choice of marker order. All matrices corresponding to a given pose can be obtained from each other through row column exchanges.

The BodyMap matrix is invariant to the rigid-body orientation and displacement of the human subject. It is self-consistent. For example, the matrix does not reflect if the person is vertically erect or floating horizontally in space. The absolute position of the markers in the world frame do not affect the BodyMap matrix (unless the marker set includes a marker that is fixed to the world frame as described below).

The BodyMap matrix may or may not provide a complete representation of the pose depending on whether the markers sufficiently populate the pose. In some cases, only a certain portion of the pose, such as the upper body, is of interest. In these cases, markers may be chosen to provide a complete representation of that portion of the pose but not necessarily the full human pose.

2. Characterization of a Pose in Low Dimension

As mentioned above, a low dimensional representation of a pose allows for easier automated handling of poses, including classification. A representation of a pose using joint angles generally involves a high dimensional representation because a large number of variables are required. A BodyMap matrix of a pose can provide a representation with fewer variables, but the number of variables may still be too high.

In one embodiment, a low dimensional representation of a human pose is obtained from a small set of dominant singular values of a BodyMap matrix for the pose. The BodyMap matrix can be normalized as described above before obtaining the singular values.

Any n×m non-zero matrix B can be expressed as a product $$B = U\Sigma V^T \quad (3)$$

where $U \in \mathbb{R}^{n \times n}$ and $V \in \mathbb{R}^{m \times m}$ are orthogonal, and $\Sigma \in \mathbb{R}^{n \times m}$ is a non-square "diagonal" matrix of the form:

$$\Sigma = \begin{bmatrix} \sigma_1 & & & & \\ & \sigma_2 & & & \\ & & \ddots & & \\ & & & \sigma_r & \\ & & & & 0 \\ & & & & & \ddots \end{bmatrix}$$

where $\sigma_1 \geq \sigma_2 \geq \sigma_3 \ldots \sigma_r \geq 0$.

The above decomposition is called the singular value decomposition of B. The entries $\sigma_1, \sigma_2, \sigma_3 \ldots \sigma_r$ of $\Sigma$ are uniquely determined, and they are called the singular values of B. The columns of U are orthonormal vectors called the right singular vectors of B whereas the columns of V are orthonormal vectors called the left singular vectors of B.

A BodyMap matrix B of size n×n has r non-zero singular values, where r is the rank of B and r≦n. A low dimensional representation of the pose associated with BodyMap matrix B can include the (possibly normalized) singular values of B. Generally, the larger singular values will contain more information about the underlying pose than the smaller values. The number of singular values to include in the representation can be based on the depth of classification and characterization required and on the computational requirements of a processing system carrying out the characterization and classification, among other factors. The minimum number of necessary singular values needed can also be determined experimentally. In one embodiment, discussed further, the three largest singular values of B ($\sigma_1$, $\sigma_2$, and $\sigma_3$) are used to represent the pose in a three-dimensional feature space. One reason for this choice is the ability of 3d visualization.

Figure 6:
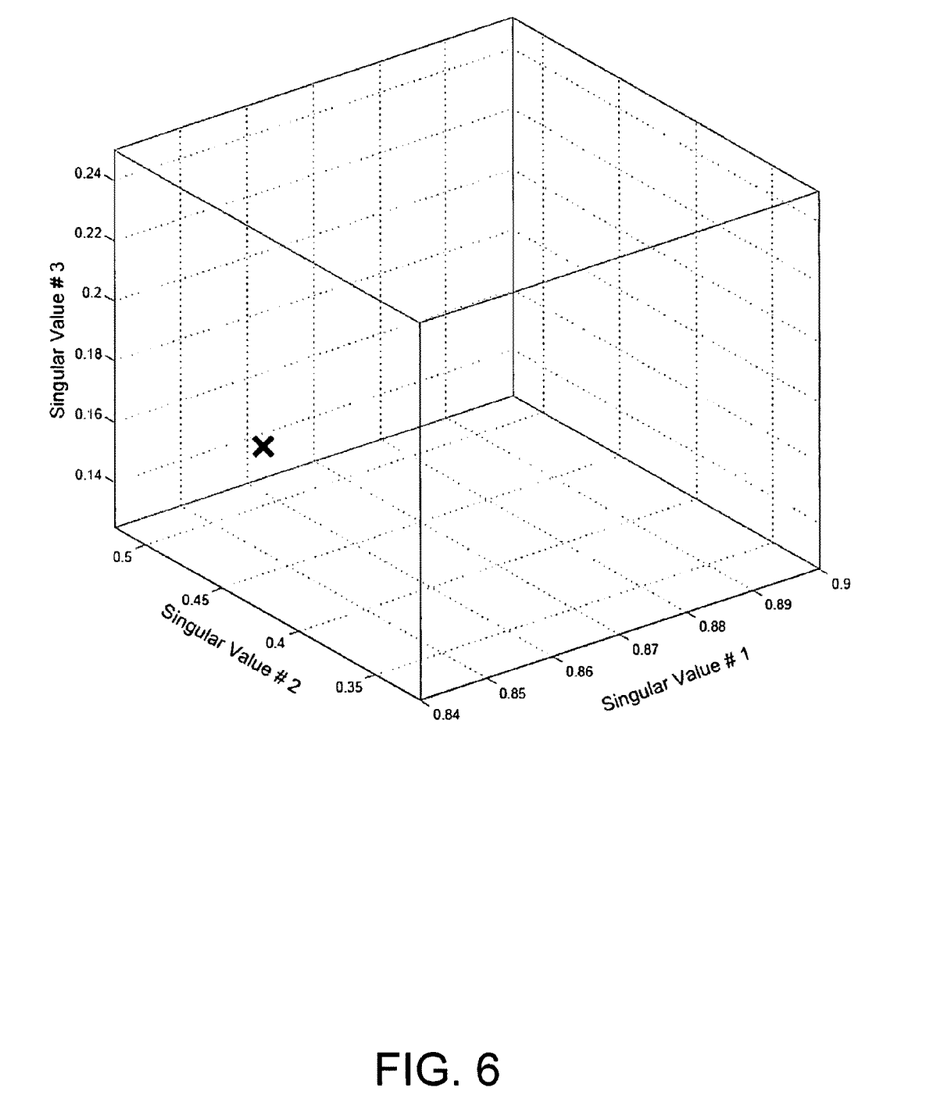
FIG. 6 illustrates a representation of the human pose of FIG. 2 in a three-dimensional feature space, according to one embodiment.

FIG. 6 illustrates a representation of the human pose of FIG. 2 in a three-dimensional feature space, according to one embodiment. The pose is represented by the point X. The x, y, and z coordinates of X are the singular values $\sigma_1$, $\sigma_2$, and $\sigma_3$, respectively, of the normalized BodyMap matrix of FIG. 3B. These three values provide a low dimensional representation of the human pose of FIG. 2 that is illustrated by the single point in FIG. 6.

One property of this representation is that the singular values will remain the same regardless of how the markers from FIG. 2 are ordered when constructing the BodyMap matrix. Also, this representation likely preserves continuity from higher dimensional representations such as the joint space illustrated in FIG. 1. If two points are contiguous in the higher dimensional joint space, they will likely be contiguous in the lower dimensional space described here.

3. Classification of a Pose in Low Dimension

A given pose can be compared to a set of known poses and classified based on its similarity to these poses. Automated classification of human pose has many useful applications in robotics and in other fields. Classifying a pose is easier when the pose is represented in a low dimension.

Figure 7:
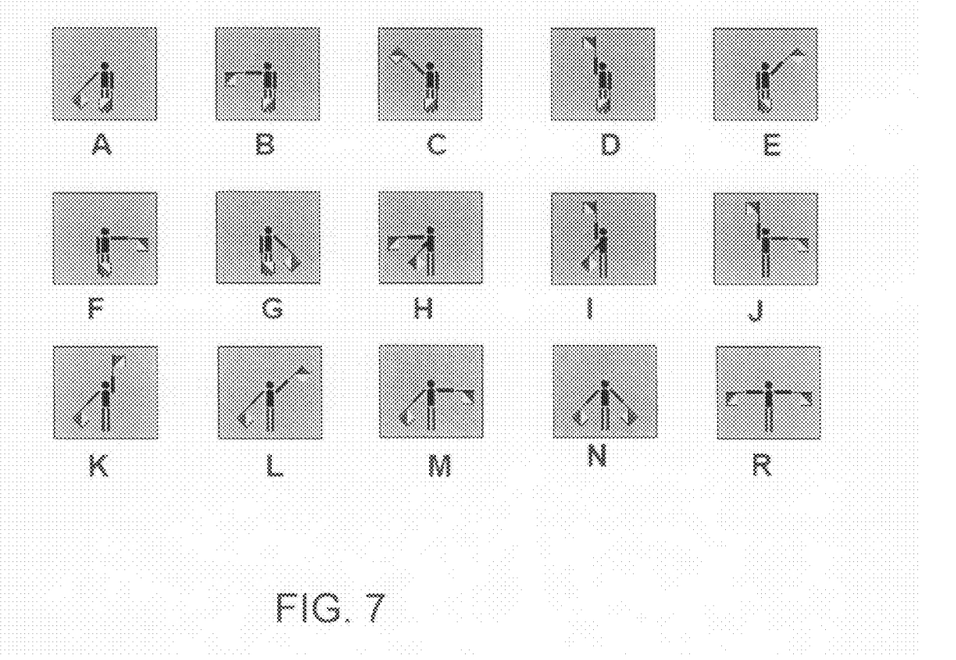
FIG. 7 illustrates a set of standard semaphores.

FIG. 7 illustrates a set of standard semaphores. In one embodiment, the human poses corresponding to these semaphores are used as a set of known poses to classify a candidate pose. The candidate pose is compared to these known poses to determine which of the poses is most similar to the candidate pose. This comparison can be carried out in a low dimension feature space.

Figure 8:
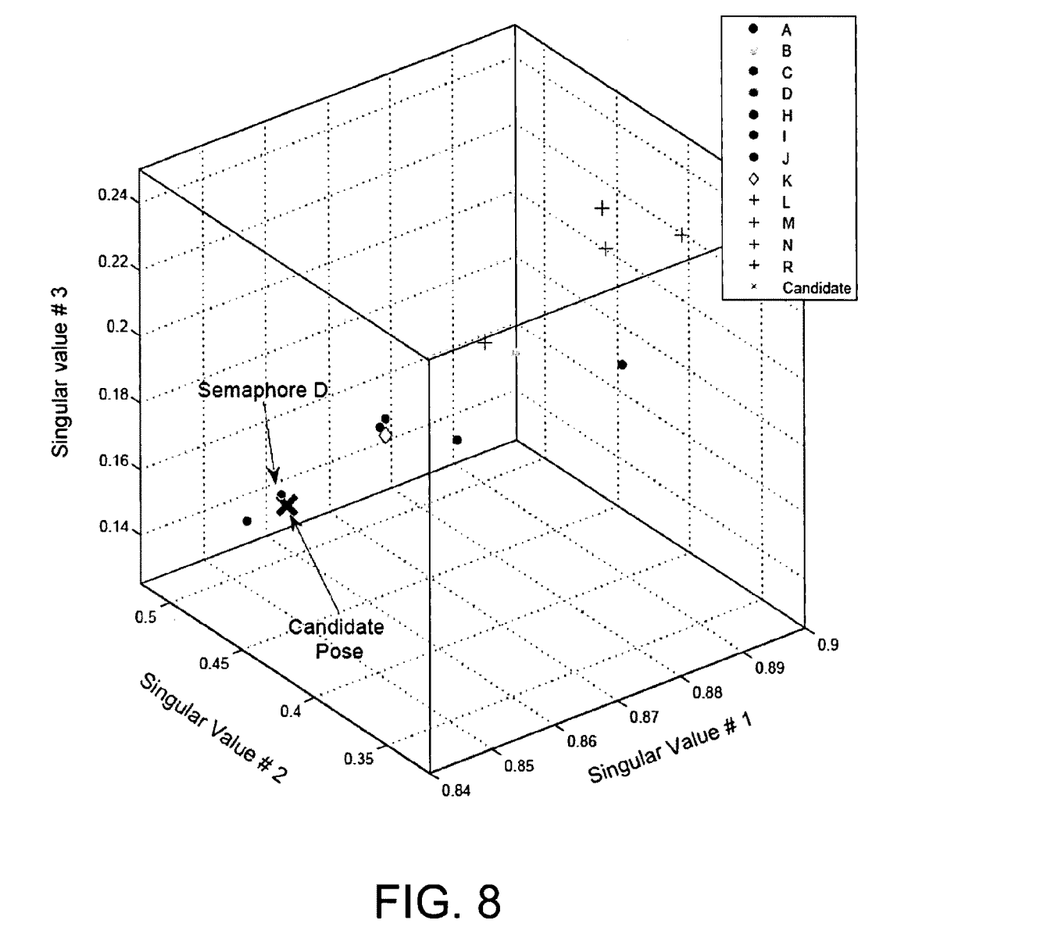
FIG. 8 illustrates representations of the pose of FIG. 2 and the poses corresponding to the semaphores of FIG. 7 in a three-dimensional feature space, according to one embodiment.

FIG. 8 illustrates representations of the pose of FIG. 2 and a set of poses corresponding to the semaphores of FIG. 7 in a three-dimensional feature space, according to one embodiment. The semaphore poses are known poses and the pose of FIG. 2 is the candidate pose to be classified. Each semaphore pose is indicated by its letter and the pose of FIG. 2 is indicated by the point X. The representations of the semaphore poses in FIG. 7 are calculated in a manner similar to that described for the pose of FIG. 2. For example, markers are placed on a human who poses in the semaphore positions, a BodyMap matrix is constructed for each pose, and the singular values of the matrices are calculated. The representations of the semaphores for E, F, and G are omitted because these poses are mirror images of C, B, and A, respectively, and therefore have the same low dimensional representation as these semaphores, as mentioned above.

In one embodiment, the candidate pose is classified by determining which semaphore pose is most similar to the candidate pose in the three-dimensional feature space. This is done by calculating the Euclidean distance between X and each of the semaphore points and choosing the smallest distance. As illustrated, X has the shortest Euclidean distance to D and can be classified as being most similar to D.

Figure 9A:
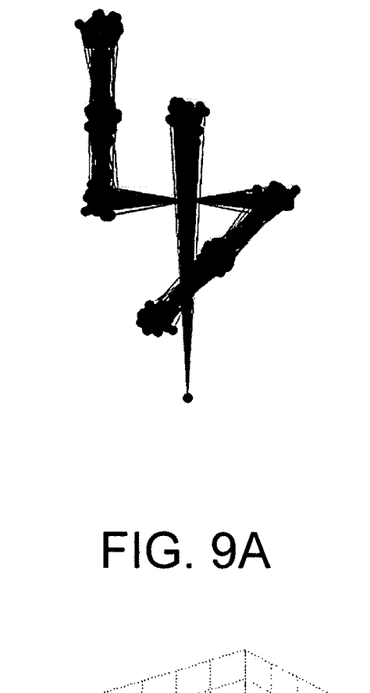
FIG. 9A illustrates the pose corresponding to semaphore I of FIG. 7 with noisy variations superimposed, according to one embodiment.
Figure 9B:
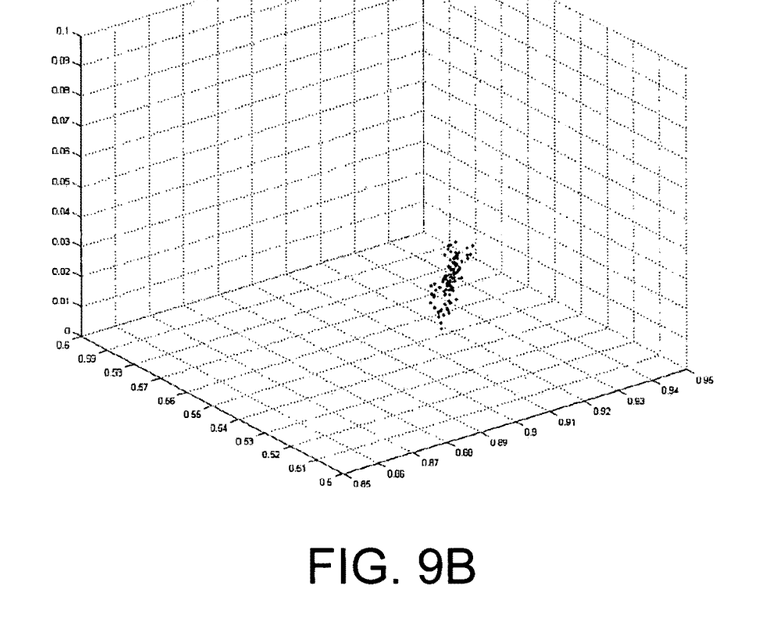
FIG. 9B illustrates a representation of the noisy variations of FIG. 9A in a three-dimensional feature space, according to one embodiment.

In one embodiment, noisy variations of known poses are also used when performing a classification. This allows for determination of the robustness of classification results in the presence of noise. FIG. 9A illustrates the human pose corresponding to semaphore I of FIG. 7 with noisy variations superimposed, according to one embodiment. These noisy variations are created, for example, by causing slight random variations in the joint angles of the original pose. In one embodiment, the original human pose is recorded and noisy variations are synthetically added. FIG. 9B illustrates representations of the noisy variations of FIG. 9A in a three-dimensional feature space, where each point corresponds to a variation. These representations can be created as described above.

In one embodiment, classification is performed by comparing a candidate pose to both known poses and noisy variations of the known poses. In this way, a more accurate (robust) classification can be performed.

Figure 10:
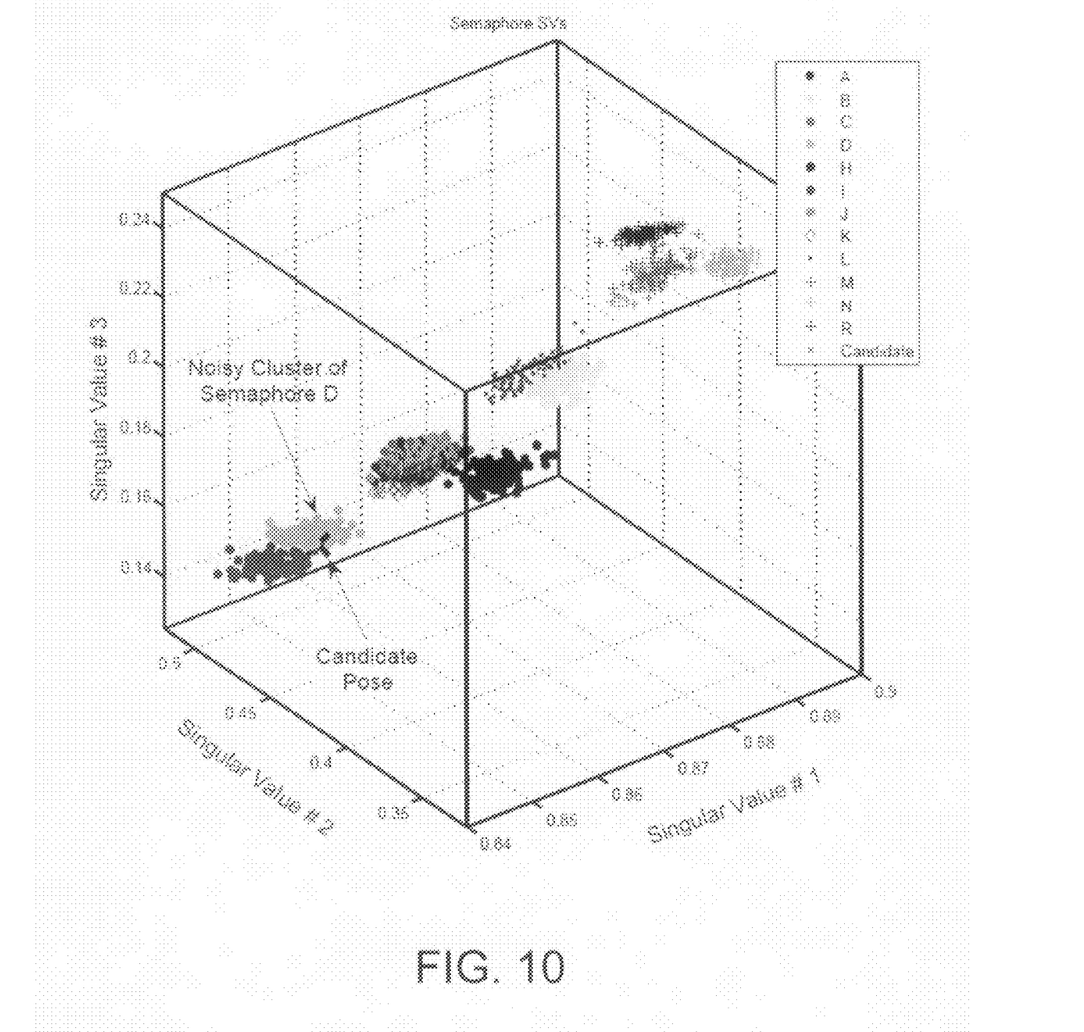
FIG. 10 illustrates representations of noisy variations of the poses corresponding to the semaphores in FIG. 7 and the pose of FIG. 2 in a three-dimensional feature space, according to one embodiment.

FIG. 10 illustrates representations of the known poses of FIG. 7 along with their noisy variations and the candidate pose of FIG. 2 in a three-dimensional feature space, according to one embodiment. Each known pose is identified by its letter shown in the legend. The candidate pose of FIG. 2 is identified by the X mark. Classification of the candidate pose is performed by determining which known pose cluster is most similar to the candidate pose.

A Mahalanobis distance is a distance measure based on correlations between variables by which different patterns can be identified and analyzed. It is a useful way of determining similarity of an unknown sample set to a known one. It differs from Euclidean distance in that it takes into account the correlations of the data set and is scale-invariant, i.e. not dependent on the scale of measurements.

Mahalanobis distances can be calculated from the candidate pose X to each cluster comprising a known pose and its noisy variations. The candidate pose can be considered more similar to poses with shorter Mahalanobis distances to the candidate pose.

The Mahalanobis distance from a cluster of values with mean $\mu = (\mu_1, \mu_2, \mu_3, \ldots, \mu_p)$ and covariance matrix $\Pi$ to a vector $x = (x_1, x_2, x_3, \ldots, x_p)$ is defined as:

$$D_M(x) = \sqrt{(x-\mu)^T \Pi_{-1}(x-\mu)} \quad (4)$$

In one embodiment, the vector x contains the coordinates of the candidate pose X. The mean $\mu_i$ and covariance matrix $\Pi_i$ are determined for each of the i known pose clusters. The mean $\mu_i$ of a known pose cluster is calculated as the average of all points in the cluster. If each point is represented as a vector with three elements, the mean $\mu_i$ will be a three-element vector that is the mean of these vectors.

The covariance matrix $\Pi_i$ for a particular cluster can be calculated by first constructing a matrix V, where V has three columns and a number of rows equal to n, the number of points in the cluster. The three columns of V contain the three coordinates of each point in the cluster. The covariance matrix is calculated by:

$$\prod_i = \frac{1}{n-1} \sum_{k=1}^{n} (V_k - \mu_i)(V_k - \mu_i)^T \quad (5)$$

where n represents the number of points in the cluster, $V_k$ represents the k-th row of V, $\mu_i$ represents the cluster mean, and T represents a matrix transpose operation.

For the example data illustrated in FIG. 10, the candidate pose is given by the feature vector [0.8562 0.4888 0.1462]. The mean values of the known pose clusters are shown in the matrix below.

$$\text{Mean} = \begin{bmatrix} 0.8567 & 0.4588 & 0.1688 \\ 0.8697 & 0.4205 & 0.1927 \\ 0.8565 & 0.4591 & 0.1690 \\ 0.8468 & 0.4850 & 0.1480 \\ 0.8648 & 0.4408 & 0.1644 \\ 0.8432 & 0.4938 & 0.1400 \\ 0.8570 & 0.4558 & 0.1721 \\ 0.8572 & 0.4581 & 0.1656 \\ 0.8661 & 0.4275 & 0.1958 \\ 0.8763 & 0.3872 & 0.2284 \\ 0.8830 & 0.3668 & 0.2323 \\ 0.8741 & 0.3844 & 0.2420 \end{bmatrix} \quad (6)$$

where the first row corresponds to the Semaphore A cluster, the second row corresponds to the Semaphore B cluster and so on.

Some of the covariance matrices are:

$$COV_A = 1.0e^{-004} * \begin{bmatrix} 0.1907 & -0.0388 & 0.1417 \\ -0.0388 & 0.0974 & -0.1246 \\ 0.1417 & -0.1246 & 0.2098 \end{bmatrix} \quad (7)\text{-}(10)$$

$$COV_B = 1.0e^{-005} * \begin{bmatrix} 0.2816 & 0.0431 & 0.0267 \\ 0.0431 & 0.3925 & -0.4897 \\ 0.0267 & -0.4897 & 0.6442 \end{bmatrix}$$

$$COV_C = 1.0e^{-005} * \begin{bmatrix} 0.3746 & 0.2988 & -0.2707 \\ 0.2988 & 0.2629 & -0.2234 \\ -0.2707 & -0.2234 & 0.2069 \end{bmatrix}$$

$$COV_D = 1.0e^{-004} * \begin{bmatrix} 0.2876 & 0.1412 & 0.0138 \\ 0.1412 & 0.0775 & 0.0098 \\ 0.0138 & 0.0098 & 0.0031 \end{bmatrix}$$

The Mahalanobis distances calculated according to Equation 4 are given below:

$$D_M = 1.0e^{+003} * \begin{bmatrix} 0.0773 \\ 0.2339 \\ 0.1017 \\ 0.0029 \\ 0.0860 \\ 0.0097 \\ 0.1306 \\ 0.0456 \\ 0.1237 \\ 0.3408 \\ 1.5859 \\ 4.5211 \end{bmatrix} \quad (11)$$

where $D_M$ is a column vector containing the Mahalanobis distances from the candidate pose to each of the known pose clusters.

On inspection, the fourth entry in the above vector, which corresponds to semaphore pose D, is the minimum. As a result, the candidate pose can be classified as a member of the D family. A visual inspection of the pose in FIG. 2 compared to pose D in FIG. 7 confirms this.

4. Extension of the BodyMap Matrix

Figure 11:
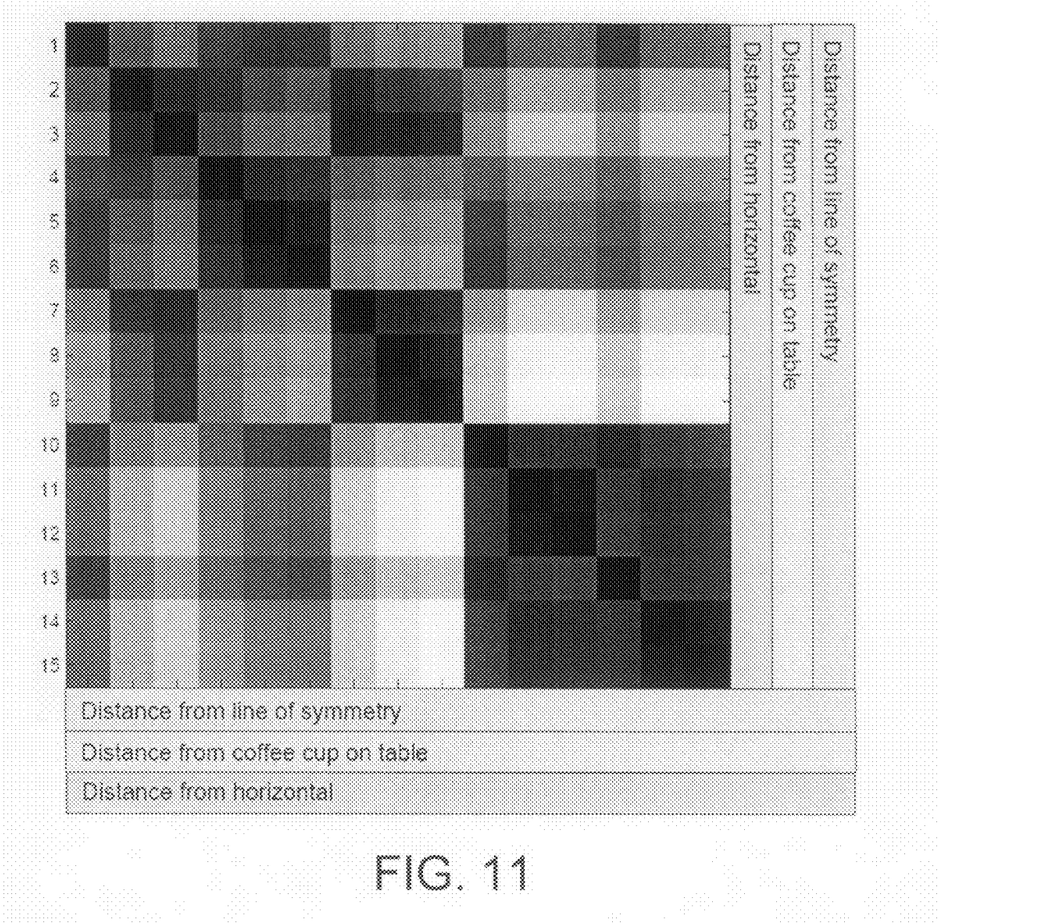
FIG. 11 illustrates a grayscale image visualization of a BodyMap matrix with additional reference points, according to one embodiment.

A BodyMap matrix can be extended to include objects or reference points in the surroundings of the human pose subject. For example, suppose that the subject is approaching a cup of coffee on a table. The location of the coffee cup can be treated as a point of interest, or marker location, and included in the BodyMap matrix. Such a BodyMap matrix includes an additional row and column containing distances to the cup. This additional row and column is shown in the grayscale image visualization of a BodyMap matrix illustrated in FIG. 11.

A BodyMap matrix can also be extended to include distances to surrounding lines, planes, or other surfaces. For example, one row and column of the BodyMap matrix can indicate distances between markers and the horizontal ground plane. This additional row and column is shown in the grayscale image visualization of a BodyMap matrix illustrated in FIG. 11. As a result, the BodyMap matrix includes information about the subject's pose relative to the ground. In another example, the BodyMap matrix can include distances from markers to a line of symmetry to determine how symmetric the pose is. This line of symmetry can change over time as the pose changes.

The use of a BodyMap matrix is not limited to stationary human body poses. A BodyMap matrix can be used to represent any set of points in space. The BodyMap matrix can also include points of interest on multiple objects, for example to characterize and classify an interaction between two people. A BodyMap matrix can also be recalculated over time to classify and characterize the motion of an object.

Although the invention has been described in considerable detail with reference to certain embodiments thereof, other embodiments are possible as will be understood to those skilled in the art.

What is claimed is:

1. A method for classifying a pose of an object, the method implemented on a computer, comprising:
   receiving a characterization of a candidate pose, the characterization based at least in part on a singular value of a first matrix for the candidate pose, the first matrix comprising an element representing a Euclidean distance between two markers on the object;
   receiving a plurality of characterizations of known poses, each characterization based at least in part on a singular value of a second matrix for a known pose, the second matrix comprising an element representing a Euclidean distance between two markers on an object of the known pose; and
   classifying the candidate pose based at least in part on similarities between the characterization of the candidate pose and the plurality of characterizations of known poses, the classifying performed by a processor of the computer, the classifying comprising:
      determining a similarity between the characterization of the candidate pose and a cluster, where the cluster comprises characterizations of a plurality of noisy variations of a known pose.

2. The method of claim 1, wherein classifying the candidate pose further comprises determining a distance between the characterization of the candidate pose and the characterization of a known pose.

3. The method of claim 2, wherein the distance is a Euclidean distance.

4. The method of claim 1, wherein determining the similarity between the characterization of the candidate pose and the cluster comprises determining the Mahalanobis distance between the characterization of the candidate pose and the cluster.

5. The method of claim 1, wherein the object is a humanoid object.

6. A computer system for classifying a pose of an object, the system comprising:
   a computer-readable storage medium embedded with code implementing instructions, the instructions comprising:
      receiving a characterization of a candidate pose, the characterization based at least in part on a singular value of a first matrix for the candidate pose, the first matrix comprising an element representing a Euclidean distance between two markers on the object;
      receiving a plurality of characterizations of known poses, each characterization based at least in part on a singular value of a second matrix for a known pose, the second matrix comprising an element representing a Euclidean distance between two markers on an object of the known pose; and
      classifying the candidate pose based at least in part on similarities between the characterization of the candidate pose and the plurality of characterizations of known poses, the classifying comprising:
         determining a similarity between the characterization of the candidate pose and a cluster, where the cluster comprises characterizations of a plurality of noisy variations of a known pose.

7. The system of claim 6, wherein classifying the candidate pose further comprises determining a distance between the characterization of the candidate pose and the characterization of a known pose.

8. The system of claim 7, wherein the distance is a Euclidean distance.

9. The system of claim 6, wherein determining the similarity between the characterization of the candidate pose and the cluster comprises determining the Mahalanobis distance between the characterization of the candidate pose and the cluster.

10. The system of claim 6, wherein the object is a humanoid object.

* * * * *